Figure 1A:
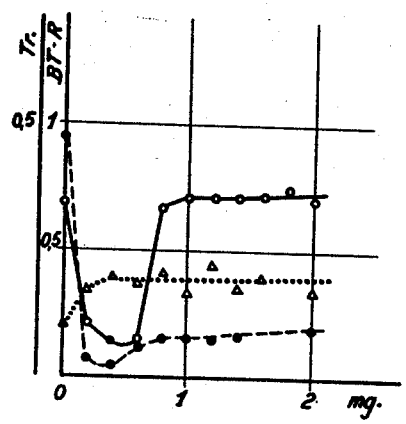

—o— A
---●--- B
·····△····· C

May 4, 1965 P. BIANCHINI 3,181,996
METHOD FOR THE PREPARATION OF A PANCREATIC HEPARINOID
Filed May 25, 1962 5 Sheets-Sheet 3

INVENTOR
Pietro Bianchini

BY Stevens, Davis, Miller & Mosher
ATTORNEYS

May 4, 1965 P. BIANCHINI 3,181,996
METHOD FOR THE PREPARATION OF A PANCREATIC HEPARINOID
Filed May 25, 1962 5 Sheets-Sheet 5

INVENTOR.
Pietro Bianchini
BY
Stevens Davis Miller & Mosher
Attorneys

United States Patent Office 3,181,996
Patented May 4, 1965

3,181,996
METHOD FOR THE PREPARATION OF A PANCREATIC HEPARINOID
Pietro Bianchini, Como, Italy, assignor to Crinos Industria Farmacobiologica S.p.A., Villaguardia, Italy
Filed May 25, 1962, Ser. No. 197,772
Claims priority, application Italy, May 25, 1961, 9,644/61
8 Claims. (Cl. 167—74)

The present invention relates to a method for the preparation of a pancreatic heparinoid.

The pancreatic heparinoid (Hepd. P) is a substance of a polyanionic nature, belonging to the group of complex sulphomucopolysaccharides, on the basis of its content of hexosamines (350 µg./mg.), hexuronic acids (360 µg./mg.), and sulphonic groups.

According to this invention there is provided a method for the preparation of a pancreatic heparinoid which comprises:

(a) Removing the fat from a cake of pancreas derived from the lipocaic process or derived from fresh pancreas by subjecting the cake to the action of an organic solvent;

(b) Then drying the cake after separation from the organic solvent extract;

(c) Dispersing the resultant powdered cake in an aqueous alkaline solution;

(d) Agitating the resultant dispersion at an elevated temperature and filtering while hot;

(e) Dispersing the resultant precipitate in an aqueous alkaline solution and agitating the resultant dispersion at an elevated temperature and filtering while hot;

(f) Combining the alkaline filtrates from stages (d) and (e) and concentrating the combined alkaline filtrates to a substantially smaller volume than the initial volume;

(g) Dialyzing the concentrate from stage (f) and if necessary filtering to remove any insoluble substances present;

(h) Precipitating the liquid with a suitable organic solvent in the presence of a weak acid;

(i) Drying the resultant precipitate and dissolving it in water with addition of a small amount of a suitable protein-digesting enzyme and rendering the mixture weakly alkaline by addition of alkali;

(j) Dialyzing the solution from stage (i) and filtering;

(k) Precipitating the filtrate from stage (j) with a suitable organic solvent in the presence of a weak acid;

(l) Drying the precipitate with a suitable organic solvent; and (m) Optionally purifying the dried precipitate from stage (l) with a suitable organic liquid in which the heparinoid is insoluble.

As mentioned above, the starting material may be a cake of pancreas derived from the lipocaic process or derived from fresh pancreas. In the latter case the following procedure may be employed prior to carrying out a process embodying the steps (a) to (m) of this invention: grinding of the fresh organ, homogenization by boiling with dilute hydrochloric acid for the required period, neutralization with an alkali metal hydroxide, and then allowing the mixture to stand. The pH of the liquid is then made weakly acidic with acetic acid, the cake obtained by means of filtration is then dried under vacuum at a maximum temperature of 50° C.

In carrying out a process embodying this invention one or more of the following advantageous procedures may be adopted.

The aqueous alkaline solution of one or both of the features (c) and (e) may be arranged to be at a pH of about 9.

The elevated temperature of one or both the features (d) and (e) may be within the range of about 65° to 75° C.

The agitation operation of one or both of the features (d) and (e) may be continued for at least half an hour.

The filtration operation of one or both of features (d) and (e) may be carried out with a pressure filter. Also the filtration operation of feature (j) may be carried out with a pressure filter.

The combined alkaline filtrates of feature (f) may be concentrated to about a quarter of the initial volume.

With regard to both or either of features (g) and (j), the dialyzing procedure may be effected by means of a semipermeable membrane, e.g. against running water, for a period such as for instance 24 to 72 hours.

The solvent of feature (a), (h) or (k) or any two or all three of the features (a), (h) and (k) may comprise a ketone, e.g. acetone.

1 part by weight of the resultant precipitate of feature (i) may be dissolved in 5 to 15 parts by volume of water. Also 1 part by weight of the resultant powdered cake of feature (c) may be dispersed in 5 to 15 parts by volume of the aqueous solution.

The protein-digesting enzyme of feature (i) may comprise papain used in the presence of a reducing agent; the reducing agent may for instance comprise sodium hyposulphite or cysteine. The protein-digesting enzyme of feature (i) may comprise trypsin which may be used in the absence of a reducing agent. A mixture of papain and trypsin may be used, if desired.

The mixture of feature (i) may be rendered weakly alkaline to a pH of about 8 by addition of the required amount of alkali. After the solution of feature (i) has been rendered weakly alkaline, the solution may be maintained at an elevated temperature, e.g. about 60° C., for at least an hour.

The solvent of feature (l) may comprise a mixture of alcohol and ether.

The organic liquid of feature (m) may comprise a phenol, e.g. phenol itself.

The precipitation of feature (h) or feature (k) or both features (h) and (k) may be carried out at a pH of about 5.

The pancreatic heparinoid obtained by a process embodying this invention gives typical reactions with many dyes and basic substances, such as Azure A (with which it forms metachromatic complexes), trypaflavin and rivanol (with which it forms insoluble and inactive complexes), long-chain quaternary ammonium bases, octylamine and clupeine (with which if forms easily dissociable complexes).

Figure 2A:
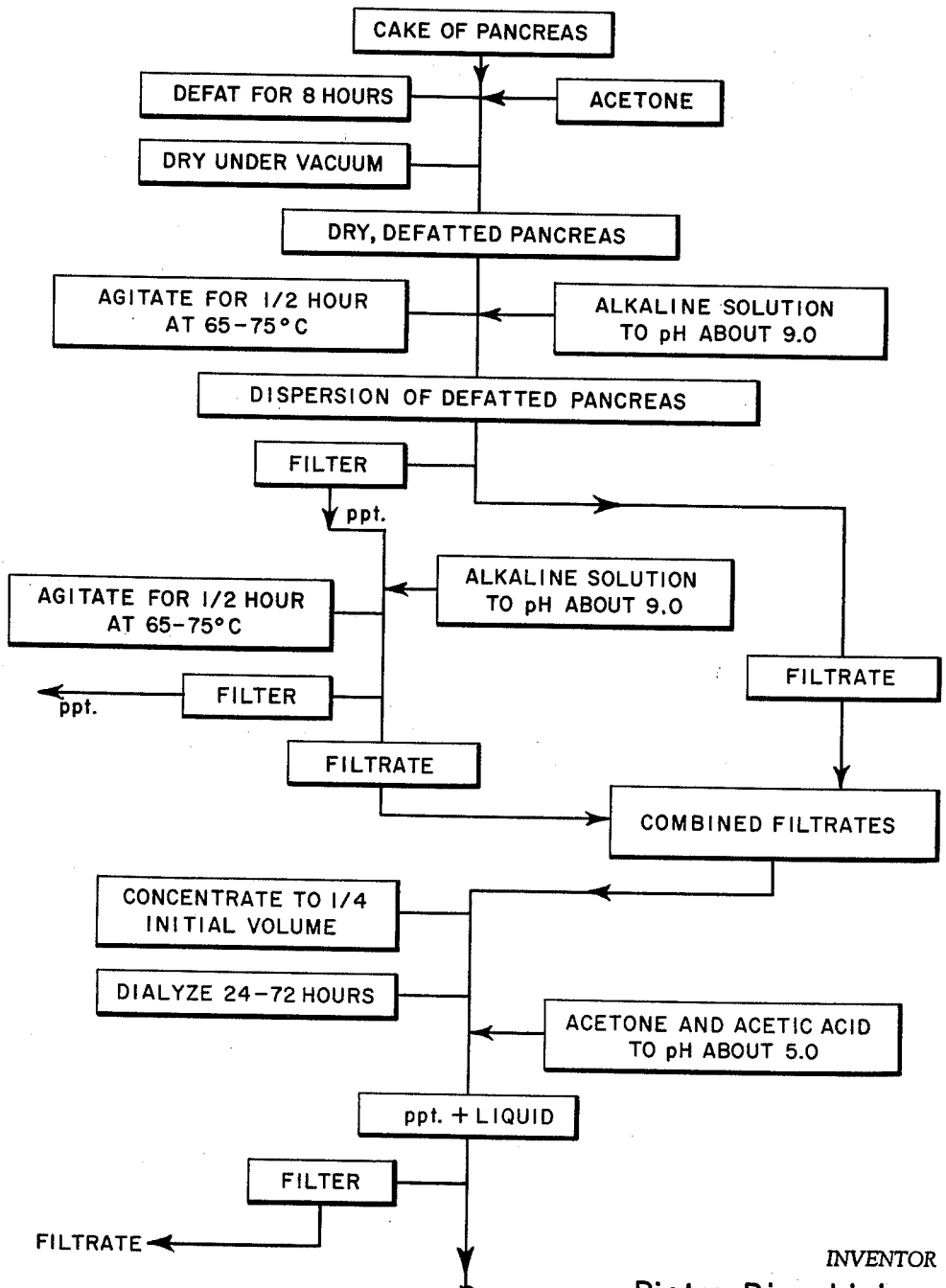
Figure 2B:
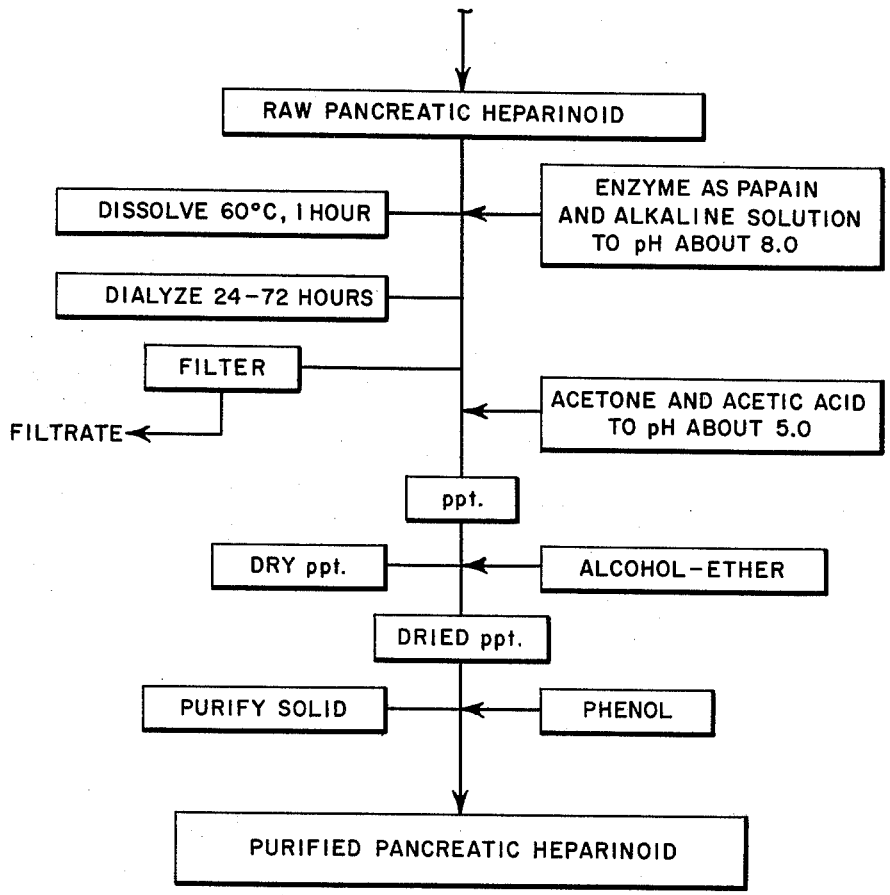

FIGS. 2a and 2b show an illustrative flow diagram of the process of the present invention.

Figure 1B:
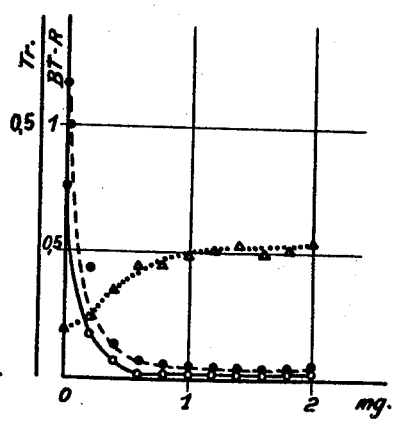
Figure 1C:
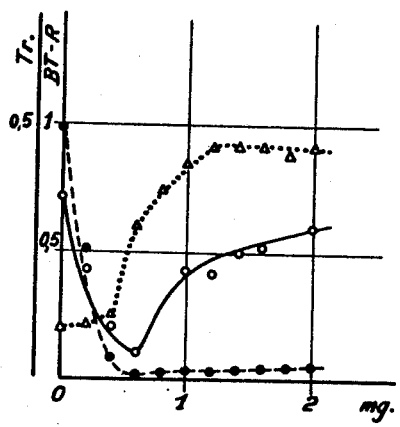
Figure 1D:
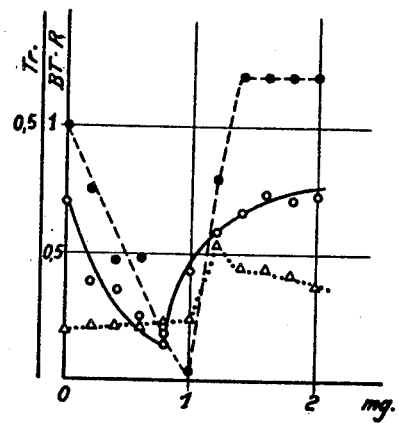

An example of highly specific activity in the formation of complexes with trypaflavin, rivanol, and toluidine blue is shown in FIGURES 1a, 1b, 1c and 1d of the accompanying drawings, in which certain natural substances with a similar structure are compared (heparin, FIG. 1a; pancreatic heparinoid, FIG. 1b; duodenal heparinoid, FIG. 1c; controitin sulphate, FIG. 1d).

The curves A, B and C of the diagrams shown in the above-mentioned figures pertain, respectively, to:

A = trypaflavin;
B = rivanol;
C = toluidine blue.

In electrophoresis the pancreatic heparinoid separates into two components ("*a*" and "*b*"), which are probably artifacts due to the formation of two different complexes with the buffered borate solution, by means of which the migration occurs.

| Substance | $U = \frac{d.l.}{t.v.}$ | Velocity in Heparin equiv. |
|---|---|---|
| Heparin | $6.5 \times 10^{-5}$ | 100 |
| Hepd. P (*a*) | $5.8 \times 10^{-5}$ | 90 |
| Hepd. P (*b*) | $4.8 \times 10^{-5}$ | 74 | pH 8.6—Borate buffered soln.—T. 20° C.—10 V/cm./3h
Whatman paper 3 MM.

In the chromatographic treatment also, the pancreatic heparinoid (Hepd. P) presents two components, with $Rf$ larger than that of the heparin, Hep. (which is taken as the reference substance).

The pancreatic heparinoid has been isolated in the crystalline state, in the form of rosette and dendritic structures.

Considering the biological activity, it is observed that the heparinoid is able to liberate the "clearing factor" when it is injected into animals (either intravenously or intraperitoneally), although the quantity liberated is less than that liberated by heparin.

The clearing activity has been determined by means of the measurement of the optical density (at 600 mg.) of 2:1 mixtures of plasma of 200 gm. rats and a solution of 0.25% Ediol. respectively; the measurement performed 10 minutes after intravenous injection of heparinoid.

Figure 3:
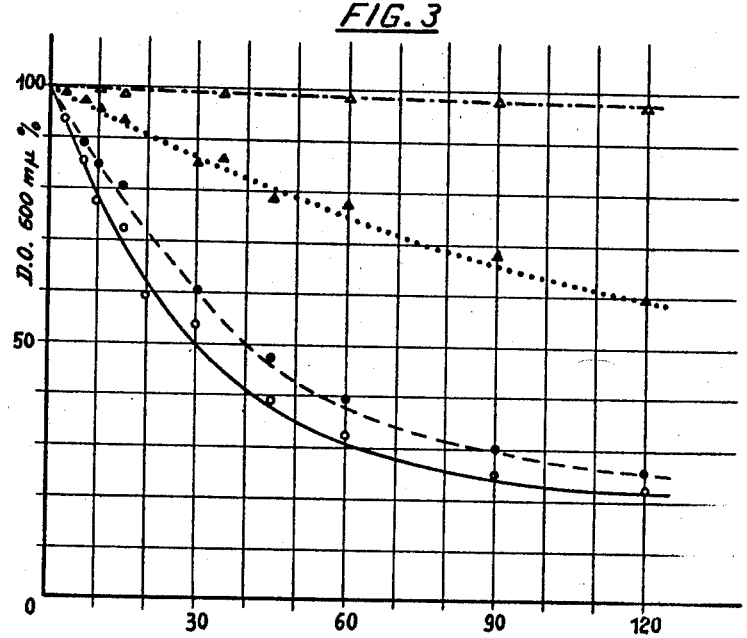

FIGURE 3 of the accompanying drawings shows the course of the clearing action of the pancreatic heparinoid (Hepd. P) in relation to heparin (Hep.).

In addition, the pancreatic heparinoid possesses an intense lipid-regulatory activity, in the sense that it corrects the experimental lipodysproteinemia induced by Triton et al., as can be observed in the following table:

| Substance | Dose, mg./kg. | O.D., 650 m$\mu$ | Lipemia, mg./100 ml. | Total cholesterol, mg./100 ml. |
|---|---|---|---|---|
| Triton (T) | 200 | 0.546 | 1,900 | 150 |
| Controls (C) | | 0.163 | 460 | 45 |
| T+Hepd. P | 150 | 0.148 | 756 | 69 |
| T+Heparin | 100 | 0.262 | 800 | 91 |

The paper chromatography of the blood fatty acids presents a different lipidic spectrum in the animals treated with Triton, Triton+pancreatic heparinoid, and the controls. Treatment with heparinoid results in a definite normalization of the lipidic picture.

Figure 4:
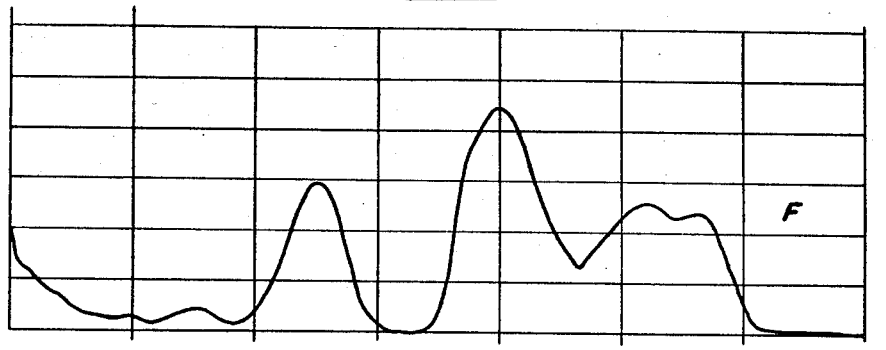
Figure 4:
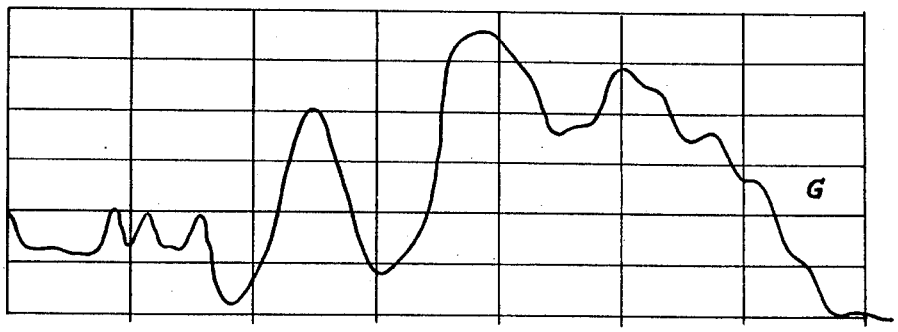
Figure 4:
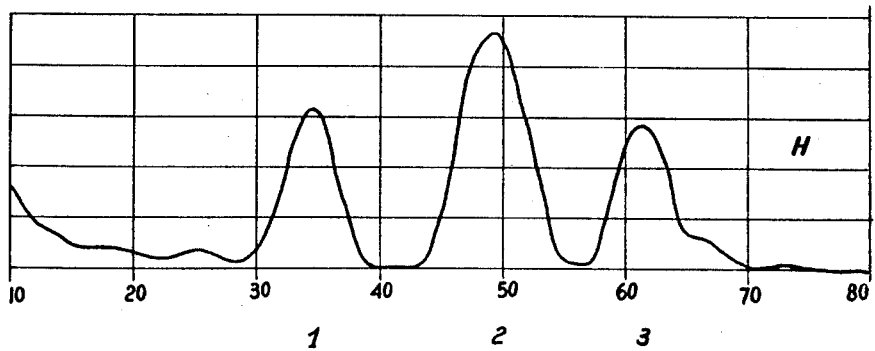

In FIGURE 4 of the accompanying drawings, the three curves F, G and H refer to the total plasma fatty acids of rats; curve P refers to the controls, curve G refers to Triton, and curve H refers to Triton+P Hepd. The abscissae 1, 2, and 3 of the diagram of FIG. 4 refer, respectively, to: the stearic acid group, the group of palmitic and oleic acids, and the group of linoleic and myristic acids. The chromtography was performed on Whatman paper 3 MM pretreated with 5% mineral oil and, with a migrating solvent composed of 90% acetic acid. The lipidic spectra are revealed by Nile Ble/NaOH.

It is observed that the stearate group remains unchanged; however the oleate and linoleate groups are notably influenced. These data are confirmed by gas-chromatographic analysis.

The pancreatic heparinoid apparently is not an anticoagulant, even in high dosages.

In reference to clinical activity, it is interesting to observe the following: Since the pancreatic heparinoid exercises notable lipid-regulatory activity on the blood (even when administered by mouth), clinical tests have been instituted, administering the substance in tablets, each composed of 10 mg. of a standard preparation containing one antilipemic unit and one anticholesterolemic unit per mg. These units represent the quantity of the preparation capable of causing a fall of 60% (compared to the controls) of the lipemic and cholesterolemic levels in animals treated with Triton.

The preliminary results obtained in a group of hypercholesterolemic subjects are reported in the following table:

TABLE

| | Cholesterolemia, $\mu$g. percent | Plasma optic density (600 m$\mu$) | Hemocoagulation time | Viscosity, centipoise | Total proteinemia, g. percent | Albumin, percent | Globulin | | | | Albumin/globulin | Beta/Alpha | Daily dose in tablets |
|---|---|---|---|---|---|---|---|---|---|---|---|---|---|
| | | | | | | | Alpha$_1$, percent | Alpha$_2$, percent | Beta, percent | Gamma, percent | | | |
| (1) D.M., a. 40 | 300 | 183 | Norm. | | 7.8 | 52 | 3.3 | 7.7 | 15 | 22 | 1.08 | 5.7 | |
| Arterial hypertension | 266 | 122 | Norm. | | 7.3 | 46 | 5.95 | 10.7 | 14.1 | 24 | 0.8 | 2.4 | 3 |
| | 205 | 105 | Norm. | | 7.05 | 50 | 4.9 | 12 | 14.1 | 19 | 1.0 | 2.1 | 5 |
| (2) R.A., a. 52 | 300 | 113 | Norm. | | 7.1 | 53 | 4.3 | 8.6 | 17.5 | 16.8 | 1.115 | 4 | |
| Atherosclerosis | 196 | 105 | Norm. | | 6.9 | 52 | 4 | 10 | 15 | 19 | 1.8 | 4.2 | 3 |
| | 230 | 125 | Norm. | | 7.4 | 52 | 4 | 13.9 | 15.1 | 15 | 1.08 | 3.9 | 3 |
| (3) F.A., a. 67 | 300 | 226 | Norm. | | 6.8 | 50 | 4 | 12 | 17 | 17 | 1 | 5.7 | |
| Atherosclerosis | 233 | 115 | Norm. | | 7.5 | 49 | 4.7 | 13.4 | 16.8 | 16.8 | 0.95 | 4.07 | 3 |
| Arterial hypertension | 185 | 135 | Norm. | | 7.2 | 40 | 7.2 | 15.2 | 14.4 | 23.5 | 0.66 | 3 | 3 |
| (4) V.A., a. 74 | 310 | 168 | Norm. | | 7.2 | 48.5 | 7 | 13.5 | 15.2 | 15.8 | 0.9 | 6 | |
| Myocard. infarct atherosclerosis. | 270 | 110 | Norm. | | 7.5 | 47 | 3.9 | 12.3 | 14.2 | 22.9 | 0.89 | 5.6 | 3 |
| (5) T.A., a. 44 | 300 | 187 | Norm. | | 7.1 | 42 | 5.5 | 11.5 | 16.7 | 23.3 | 0.7 | 5.2 | |
| Arterial hypertension | 260 | 96 | Norm. | | 7.5 | 45 | 4.8 | 10.3 | 14.4 | 25.5 | 0.8 | 2.6 | 3 |
| (6) R.G., a. 65 | 340 | 175 | Norm. | | 6.9 | 55 | 3.8 | 10.5 | 13.2 | 17.5 | 1.2 | 4.31 | |
| Atherosclerosis | 220 | 127 | Norm. | | 7.3 | 57 | 3.3 | 11.5 | 10 | 18.2 | 1.1 | 2.44 | 3 |
| (7) D.R.L., a. 49 | 290 | 137 | Nrom. | | 7.4 | 49 | 5.5 | 10.8 | 11 | 23.7 | 0.9 | 3.9 | |
| Arterial hypertension | 205 | 106 | Norm. | | 6.9 | 50 | 5.1 | 12.4 | 13 | 20 | 1 | 2.56 | 3 |
| (8) V.S., a. 40 | 415 | 460 | Norm. | | 7 | 50 | 4 | 8 | 13 | 25 | 1 | 3.88 | |
| Chronic hepatitis | 170 | 222 | Norm. | | 6.6 | 46 | 3.2 | 7.9 | 12 | 31 | 0.85 | 3.40 | 3 |
| (9) M.E., a. 68 | 250 | 307 | Norm. | 4.7 | 7.2 | 50 | 2 | 8 | 23 | 17 | 1 | 5.8 | |
| Arterial hypertension atherosclerosis | 280 | 290 | Norm. | 4.7 | 7.1 | 51 | 3 | 7.5 | 20 | 18.5 | 1.04 | 5.3 | 3 |
| (10) M.L., a. 66 | 300 | 99 | Norm. | 5.5 | 6.7 | 51 | 3.6 | 7 | 13.5 | 23.5 | 1.04 | 4 | |
| Atherosclerosis | 210 | 139 | Norm. | 4.7 | 7.5 | 65 | 2.3 | 7.6 | 10 | 14.5 | 1.36 | 3 | 5 |
| (11) C.A., a. 48 | 323 | 109 | Norm. | 5.5 | 7.2 | 50 | 2 | 8.5 | 15.5 | 24 | 1 | 4.97 | |
| Arterial hypertension | 300 | 104 | Norm. | 5.2 | 7.0 | 51.6 | 3 | 7 | 14 | 24 | 1.06 | 4.19 | 3 |
| | 296 | 251 | Norm. | 5.2 | 7.9 | 48 | 5 | 8 | 15 | 24 | 0.92 | 4.26 | 3 |
| Angina pectoris | 286 | 174 | Norm. | 4.9 | 7.2 | 56 | 3.6 | 5.7 | 11.2 | 22.6 | 1.27 | 4.55 | 5 |
| (12) C.M., a. 49 | 600 | 448 | Norm. | 4.7 | 3.26 | 29.3 | 8.09 | 30.3 | 21.2 | 11.1 | 0.41 | 13.7 | |
| Lipoid nephrosis | 520 | 380 | Norm. | 5.5 | 5.30 | 40 | 6 | 24 | 18.8 | 11.2 | 0.66 | 9 | 5 |
| (13) L.M., a. 56 | 266 | 117 | Norm. | 5.3 | 6.95 | 57.2 | 3.1 | 6.4 | 10.1 | 23.2 | 1.34 | 4.26 | |

TABLE

| | Cholesterolemia, μg. percent | Plasma optic density (600 mμ) | Hemocoagulation time | Viscosity, centipoise | Total proteinemia, g. percent | Albumin, percent | Globulin | | | | Albumin/globulin | Beta/Alpha | Daily dose in tablets |
|---|---|---|---|---|---|---|---|---|---|---|---|---|---|
| | | | | | | | Alpha₁, percent | Alpha₂, percent | Beta, percent | Gamma, percent | | | |
| Arterial hypertension atherosclerosis myocardiosclerosis | 210 | 118 | Norm. | 4.6 | 7.25 | 59.9 | 2.3 | 5.9 | 11.2 | 20.7 | 1.50 | 4 | 4 |
| (14) T.V., a. 56 | 300 | 133 | Norm. | 6.2 | 7.8 | 63.5 | 1.8 | 9.2 | 11.8 | 13.6 | 1.74 | 3.54 | |
| Atherosclerosis hypertension | 285 | 129 | Norm. | 5.5 | 7.5 | 58.2 | 2.4 | 8.3 | 13.1 | 18 | 1.39 | 2.93 | 5 |
| (15) M.P., a. 77 | 300 | 134 | Norm. | 5.5 | 7.5 | 66 | 1.7 | 5.3 | 12 | 14.4 | 1.94 | 7.33 | |
| Atherosclerosis | 256 | 106 | Norm. | 5 | 7.2 | 50 | 2 | 6 | 15 | 27 | 1 | 4.03 | 4 |
| (16) I.E., a. 55 | 256 | 120 | Norm. | 4.5 | 6.4 | 57 | 1.8 | 5.4 | 11.6 | 24.2 | 1.3 | 2.31 | |
| Atherosclerosis retinal spasm hypertension | 300 | 119 | Norm. | 4.8 | 7 | 53 | 3.5 | 7 | 12 | 24.5 | 1.1 | 3.5 | 5 |

A method of preparation a pancreatic heparinoid, embodying this invention, will be described in detail by the following examples.

Example 1

50 kg. of caked pancreas (from the residue of the lipocaic process) are freed from fat, continually for 8 hours in an appropriate apparatus, using 200 litres of acetone. After separation from the acetonic liquid, the cake is dried in an oven under vacuum, and the powder so obtained is dispersed in water (alkalinized up to a pH of 9 using caustic soda) in a proportion of 1 part by weight of powder to 10 parts by volume of water. While shaking, the suspension is brought up to a temperature of 70° C., maintaining a constant pH for 30 minutes. After filtration of the hot contents (using a pressure filter), the procedure of dispersion in alkaline water is repeated. The combined alkaline liquids are concentrated until the volume is reduced to ¼ of the initial volume, and the concentrated alkaline liquid is dialyzed through a semi-permeable membrane for 48 hours against running water. After filtration (to remove a light precipitate that is formed), precipitation is effected with 1.25 volumes of acetone, while shaking vigorously; at the same time the pH is brought to 5 with acetic acid. After drying, the precipitate so obtained is dissolved in water as a 10% solution, with the addition of 1% sodium hyposulphite and 0.1% of commercial papain. The pH is brought to 8 using caustic soda, and the liquid is maintained at 60° C. for 8 hours. The contents are then dialyzed against running water for 48 hours through semipermeable membranes, the contents are filtered (using a pressure filter), the clear filtrate is reprecipitated with 1.5 volumes of acetone, and the pH is again brought to 5 with acetic acid. The obtained precipitate is dehydrated by means of washing with alcohol-ether, and the white powder so obtained can be used directly for the preparation of tablets. It can be purified by means of treating it with 90% phenol (5% of powder by weight per unit volume of phenol). The product, insoluble in phenol, has a grade of purity 10 times that of the crude product.

Example 2

For extraction from fresh pancreas, the fresh organ is finely ground, 3 volumes of 5% hydrochloric acid are added and the contents are homogenized and boiled for 10 minutes; the pH is then brought to 6.8–7 with caustic soda, the contents are left to stand for two hours and then are re-acidified with acetic acid (pH 5). After filtration and drying under vacuum (at a maximum temperature of 50° C.) the cake is ready for the extraction of the heparinoid. The heparinoid is then prepared as described in Example 1.

What I claim is:
1. A method for the preparation of a pancreatic heparinoid which comprises:
 (a) removing the fat from a cake of pancreas by subjecting the cake to the action of an organic solvent;
 (b) then drying the cake after separation from the organic solvent extract;
 (c) dispersing the resultant powdered cake in an aqueous alkaline solution;
 (d) agitating the resultant dispersion at an elevated temperature and filtering while hot;
 (e) dispersing the resultant precipitate in an aqueous alkaline solution and agitating the resultant dispersion at an elevated temperature and filtering while hot;
 (f) combining the alkaline filtrates from stages (d) and (e) and concentrating the combined alkaline filtrates to a substantially smaller volume than the initial volume;
 (g) dialyzing the concentrate from stage (f);
 (h) precipitating the liquid with a suitable organic solvent in the presence of a weak acid;
 (i) drying the resultant precipitate and dissolving it in water with addition of a small amount of a suitable protein-digesting enzyme and rendering the mixture weakly alkaline;
 (j) dialyzing the solution from stage (i) and filtering;
 (k) precipitating the filtrate from stage (j) with a suitable organic solvent in the presence of a weak acid;
 (l) and drying the precipitate with a suitable organic solvent.

2. Method according to claim 1, further comprising filtering the liquid from the stage (g) to remove insoluble substance prior to precipitating the liquid according to stage (h); and purifying the dried precipitate from stage (l) with a suitable organic liquid in which the heparinoid is insoluble.

3. Pancreatic heparinoid prepared by the method of claim 1.

4. A method for the preparation of a pancreatic heparinoid which comprises:
 (a) removing the fat from a cake of pancreas by subjecting the cake to the action of an organic solvent;
 (b) then drying the cake after separation from the organic solvent extract;
 (c) dispersing each part by weight of the resultant powdered cake in an aqueous alkaline solution at a pH of about 9;
 (d) agitating for at least half an hour the resultant dispersion at an elevated temperature within the range of about 65 to 75° C., and filtering while hot;
 (e) dispersing the resultant precipitate in an aqueous alkaline solution at a pH of about 9, and agitating the resultant dispersion for at least half an hour at an elevated temperature within the range of about 65 to 75° C., and filtering while hot;
 (f) combining the alkaline filtrates from stages (d) and (e) and concentrating the combined alkaline filtrates;
 (g) dialyzing the concentrate from stage (f) through a semi-permeable membrane for a period within the range of 24 to 72 hours;

(h) precipitating the liquid with a suitable organic solvent in the presence of a weak acid;

(i) drying the resultant precipitate and dissolving each part by weight of it in water with addition of a small amount of a suitable protein-digesting enzyme and bringing the mixture to a pH of about 8 by addition of alkali, the solution being maintained at a temperature of about 60° C. for at least one hour;

(j) dialyzing the solution from stage (i) through a semi-permeable membrane for a period within the range from 24 to 72 hours, and filtering;

(k) precipitating the filtrate from stage (j) with a suitable organic solvent in the presence of a weak acid;

(l) drying the precipitate with a mixture of alcohol and ether;

(m) and purifying the dried precipitate from stage (l) with a phenol in which the heparinoid is insoluble.

5. Method according to claim 4 wherein the organic solvent of stages (a), (h) and (k) includes a ketone.

6. Method according to claim 4, wherein the protein-digesting enzyme of stage (i) comprises papain used in the presence of a reducing agent selected from the group consisting of sodium hyposulphite and cystein.

7. Method according to claim 4, wherein the protein-digesting enzyme of stage (i) comprises trypsin.

8. Method according to claim 4 wherein the precipitation of stages (h) and (k) is carried out at a pH of about 5.

References Cited by the Examiner

UNITED STATES PATENTS 2,954,321   9/60   Coleman et al. _____ 167—74

JULIAN S. LEVITT, *Primary Examiner.*

FRANK CACCIAPAGLIA, Jr., LEWIS GOTTS,
*Examiners.*